(12) United States Patent
Chang et al.

(10) Patent No.: US 7,627,101 B2
(45) Date of Patent: Dec. 1, 2009

(54) METHOD AND APPARATUS FOR TELEPHONE ROUTING BETWEEN PTN AND PSTN

(75) Inventors: Ming-Feng Chang, Hsinchu (TW);
Yi-Bing Lin, Hsinchu Hsien (TW);
Ching-Feng Liang, Hsinchu Hsien (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 906 days.

(21) Appl. No.: 11/338,181

(22) Filed: Jan. 23, 2006

(65) Prior Publication Data
US 2007/0123218 A1    May 31, 2007

(30) Foreign Application Priority Data
Nov. 14, 2005    (TW) ................ 94139895 A

(51) Int. Cl.
*H04M 3/00* (2006.01)
(52) U.S. Cl. ............... 379/198; 379/207.15; 379/234
(58) Field of Classification Search .......... 379/198, 379/207.15, 234
See application file for complete search history.

(56) References Cited

U.S. PATENT DOCUMENTS

| 7,162,018 | B2 * | 1/2007 | Toyoshima et al. ..... 379/142.01 |
| 7,272,386 | B2 * | 9/2007 | Meer ..................... 455/414.1 |
| 7,369,530 | B2 * | 5/2008 | Keagy ..................... 370/340 |
| 2003/0039238 | A1 | 2/2003 | Ollis et al. ............... 370/352 |
| 2003/0148757 | A1 * | 8/2003 | Meer ......................... 455/414 |
| 2003/0194060 | A1 * | 10/2003 | Stumer et al. ............... 379/45 |

* cited by examiner

*Primary Examiner*—Creighton Smith

(57) ABSTRACT

Disclosed is a method and apparatus applicable to an interface between PSTN and PTN for telephone routing. The interface includes a branch switch, a key system, a network branch switch, and media gateway, etc. The telephone routing method and apparatus of the present invention creates, maintains, and utilizes a call-back routing table to enable a specified PSTN user to call the callback external leased line to reach a specified PTN user in a one-stage dialing manner. The process of one-stage dialing includes PTN call origination to PSTN, PSTN call origination to PTN, and callback tag insertion in the call-back routing table. The call-back routing table consists of a plurality of call-back tags. Each call-back tag consists of at least a data triple, i.e. PTN user identifier, PSTN called party telephone number, and callback leased line identifier.

20 Claims, 8 Drawing Sheets

METHOD AND APPARATUS FOR TELEPHONE ROUTING BETWEEN PTN AND PSTN

FIELD OF THE INVENTION

The present invention generally relates to telephone networks, and more specifically to a method and apparatus for telephone routing between a private telephone network (PTN) and a public switched telephone network (PSTN).

BACKGROUND OF THE INVENTION

Caller ID has been a popular service provided by public wired and mobile phone networks. Wired phones or mobile phones with caller ID feature are also popularly available at stores almost everywhere. The caller ID feature not only allows users to screen incoming calls, but also grants users the advantage of direct callback capability with the caller ID stored. This saves time and effort for phone number look up and phone number key in.

In spite of the recent out booming of network phone development, there is one general limitation, however, to the use of a current network phone. A PSTN user cannot take the advantage of the caller ID feature to call back a user from a network phone. Unless with the direct inward dialing (DID) service provided by an intelligent phone network, a user within a phone network cannot be directly reachable by one-stage-dialing. Such limitation also exists in the phone communication between users in a conventional private phone system and the users from a PSTN.

Currently, private telephone networks have been widely deployed in most companies, enterprise phone networks, and internet phone networks. A typical private enterprise phone network uses a private branch exchange (PBX) or a key system to access to each employee's extension phone through internal switching circuitry. A PBX usually connects to the PSTN with a few external leased lines, by which each extension phone within the PTN can access to the users in the PSTN. FIG. 1a illustrates an environment for such an enterprise PTN.

Referring to FIG. 1a, as an example, a PTN user A at extension 123 attempts to call a PSTN user B at 2705-8167. The general procedure is as follows. User A picks up the phone set and dials 0 or 9 to inform the PBX of an outgoing call; the PBX dynamically chooses an unused external leased line, (for example the line at number 2793-7887), and connects to the internal line at extension 123 for user A; user A hears the dial tune from the PSTN; user A then dials user B's external number 2705-8167. When user B's phone rings, the caller ID that the user B sees on the phone display is the external line number, 2793-7887.

Under such circumstances, regardless if the call from user A is picked up by user B or not, the caller ID 2793-7887 is logged in user B's phone. Sometime later, when user B tries to call back user A with this caller ID, user B cannot directly reach user A's extension 123. User B's call is first picked up by the PBX, then user B gives the PBX further instruction with the internal extension 123 or asks the main dispatcher to redirect the call to extension 123. This procedure is referred to as two-stage dialing.

The two-stage dialing limitation for a PTN system is either due to the private number plan used in a PTN other than the public numbering used in the PSTN, or due to the number of external leased lines which connect a PTN to a PSTN is less than the number of users in the PTN for economic reasons.

To simplify the calling procedure to reach a PTN user to one-stage dialing, the conventional PSTN and PBX manufactures use the suffix three or four digits of a phone number as the internal extension identifier to provide the direct access to a PTN number. When a PSTN user dials a number, such as 2793-0123, with the prefix digits, 27930, the PSTN recognizes it as the main line of an enterprise PTN and connects the call to the PBX of the enterprise PTN and provides the suffix 3 or 4 digits, such as 123, to the PBX. The PBX can direct the incoming call to the designated extension 123 without the need to pick up the call and thus accomplishes a one-stage dialing.

Even with such one-stage direct dialing capability, when user A makes a call to a PSTN user B at 2705-8167 through the internal extension phone at 123, user A still goes through the same fore mentioned procedure, in which the PBX dynamically selects an unused external line to connect to the PSTN. Eventually the caller ID displayed on user B's phone is still the leased line number, 2793-7887, instead of user A's direct dialing number, 2793-0123. When user B uses this caller ID to call back user A, the process still needs two-stage dialing to complete the call.

With the prevailing trend of network phones, enterprise PTNs start using network phones and local area network to replace the conventional telephony-based analog phones and telephone wiring. FIG. 1b illustrates a PTN environment with network phone architecture, wherein the conventional private branch exchange (PBX) is replaced by either an internet protocol private branch exchange (IP PBX), or a media gateway. An IP PBX or a media gateway still connects to the PSTN with a few external leased lines.

When a PTN user A (with a unique identifier name), via a network phone (with a unique network address), makes a call to a PSTN user B at 2705-8167, the IP PBX or the media gateway recognizes the destination number as an PSTN number and dynamically chooses an unused leased line, (for example the line at number 2793-7887), to setup the call. Eventually the caller ID displayed at the PSTN user B's phone is still the number for the external leased line, 2793-7887. When user B uses this caller ID to call back PTN user A, the frustration of two-stage dialing still exists. The PTN user identifier name cannot be passed to the PSTN user when a PTN user (user A) calls a PSTN user (user B).

SUMMARY OF THE INVENTION

The present invention provides a method and apparatus as an interface between a PTN and the PSTN for telephone routing to resolve the fore mentioned two-stage dialing inconvenience when a PSTN user calls back a PTN user with caller ID feature. This routing method is applied in an interface apparatus between PSTN and PTN, wherein the interface may include a branch switch, a key system, a network branch switch, a media gateway, etc.

Such interface apparatus uses a plurality of external leased lines to connect to at least one PSTN and connects to a plurality of internal telephony devices via an internal network. This interface apparatus provides mutual phone calling and receiving functions between the internal telephony devices and PSTN users.

The telephone routing method and apparatus of the present invention creates, maintains, and utilizes a call-back routing table to enable a specified PSTN user to call back the external line to reach a specified PTN user in a one-stage dialing manner. The call-back table includes a plurality of call-back tags. Each call-back tag consists of at least three data fields:

the PTN user identifier, the PSTN called party number, and the external line number used for the call.

When a PTN user A originates a call setup request to a PSTN user B via internal calling device (i.e. a PTN caller), the present invention receives the data pair (the PTN caller identifier, the PSTN called party number) and uses it as the key value to search the call-back table. If there is no matched tag in the call-back table, it finds an unused external line to set up the call to the PSTN user B. A new callback tag, consisting of the selected external line number, the PTN caller identifier, and the PSTN called party number, is created and inserted in the call-back table.

When the PSTN user B receives the call from the external line number and uses it to call back the PTN user A, the interface apparatus receives the PSTN number of user B via the external line the PSTN user B calls back with. With the data pair (the PSTN called party number, the external line number) as the key value to search the call-back table, the previously inserted call-back tag with matched PSTN called party number and the external line number can be found. With the PTN user identifier stored in the matched call-back tag, the present invention can route the incoming call to the internal telephony device having the PTN user identifier and accomplish the one-stage dialing.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 2 is a diagram illustrating a network phone environment that the present invention can be applied to.

DETAILED DESCRIPTION OF THE PREFERRED EMBODIMENTS

Figure 1A:
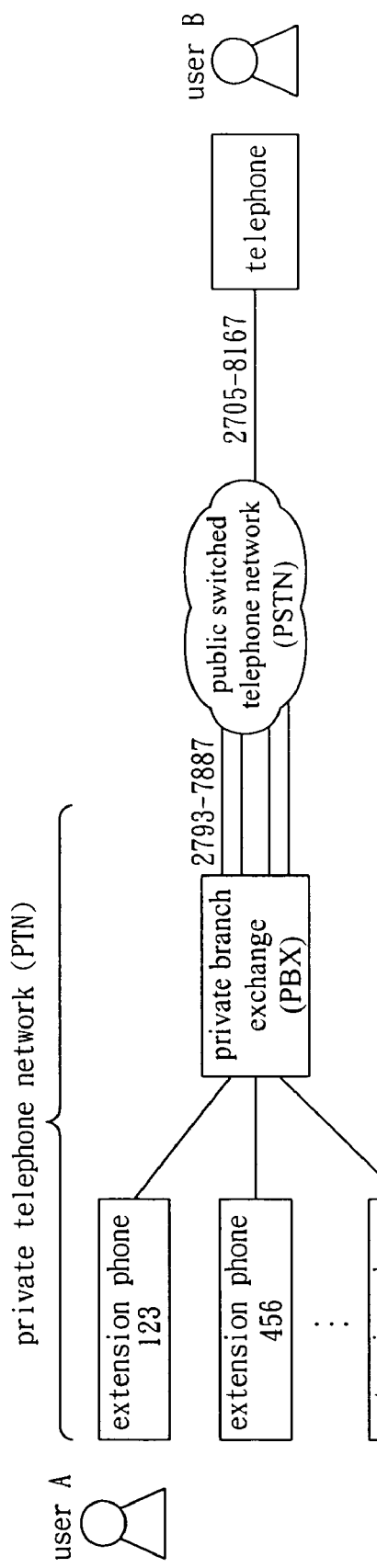
FIG. 1a is a diagram illustrating a conventional PTN environment.
Figure 1B:
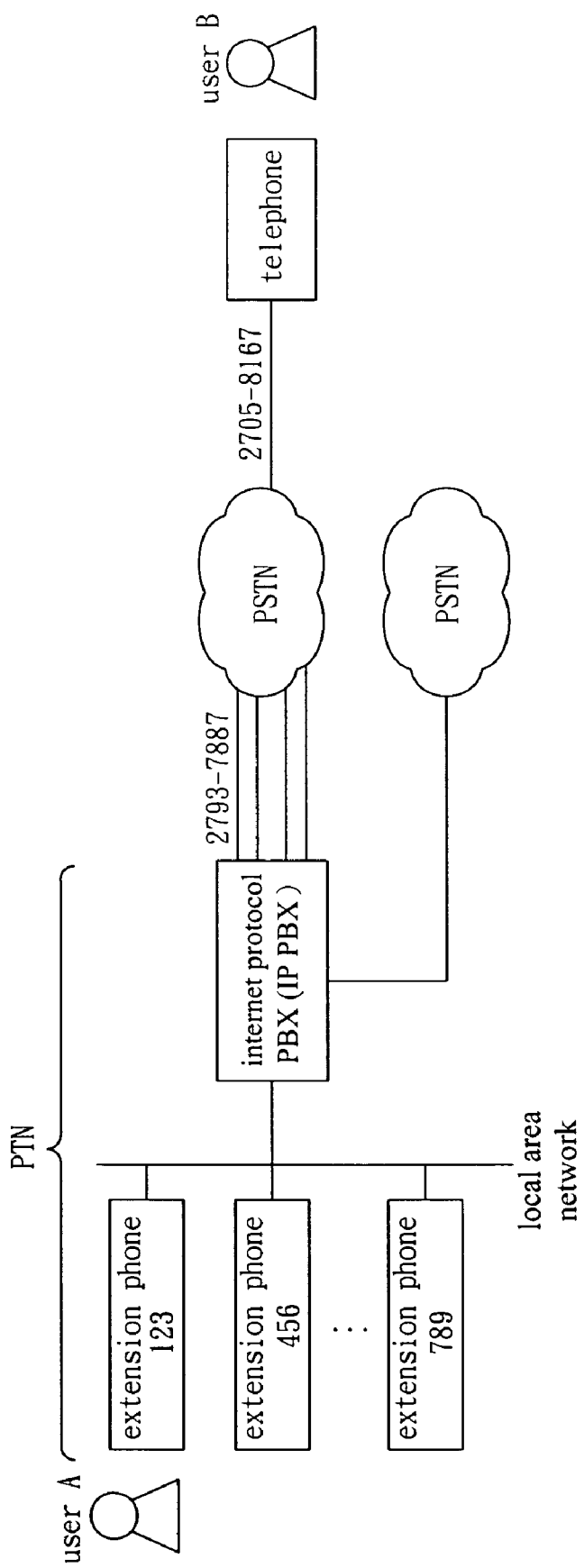
FIG. 1b is a diagram illustrating another conventional PTN environment.
Figure 2:
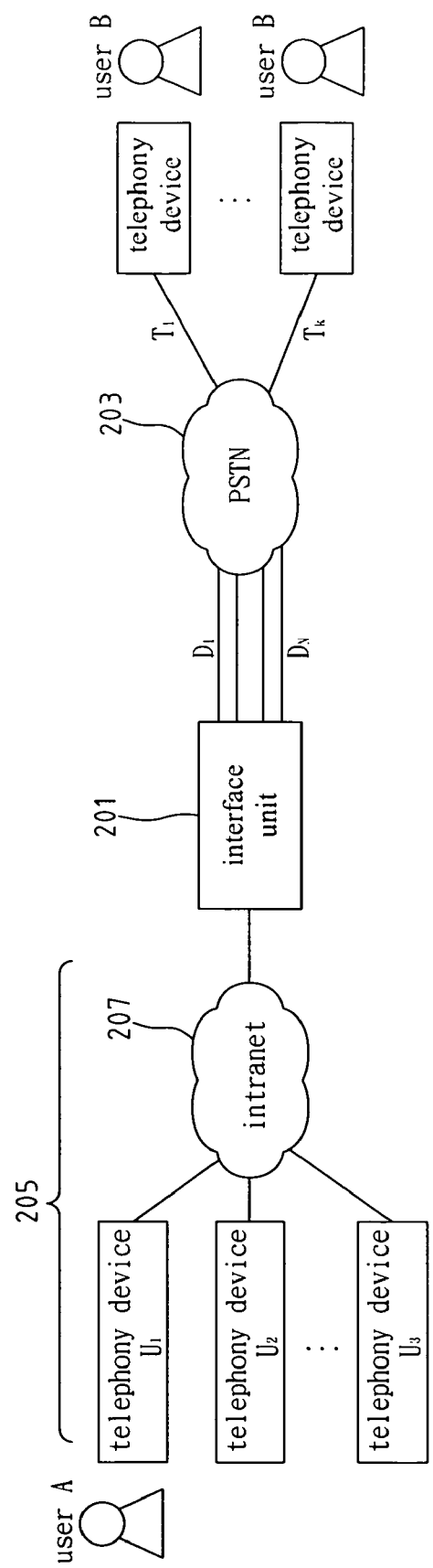

FIG. 2 a diagram illustrating a network phone environment that the present invention can be applied to. Referring to FIG. 2, a telephone routing apparatus according to the present invention comprises an interface unit 201 which provides a connection between a PSTN 203 and a PTN 205. The interface unit 201 connects to the PSTN 203 via N number of external lines. Such N external lines are assigned with the phone numbers $D_1$-$D_N$, respectively. This interface unit 201, on the other hand, connects to M number of internal telephonic apparatuses via an intranet 207. The PTN 205 includes the intranet 207 and the M number of internal telephony devices. Each of the internal telephony devices has its own identifier. Such M identifiers are noted as $U_1$-$U_M$, respectively. There are K numbers of PSTN receivers, which are assigned with phone numbers $T_1$-$T_K$, respectively.

Please be noted that, such interface unit 201 can be included in an interface apparatus, such as a branch switch, a key system, a network branch switch, a media gateway, etc. Such interface unit 201 can be part of the control firmware of an interface apparatus; or can be implemented as a software module which is installed and executed on the interface apparatus when the interface apparatus is an operational apparatus (such as some network branch switches which are implemented with computers/servers).

A PSTN can be either a wired PSTN or a wireless mobile phone network. The N external lines of the interface unit 201 can be partially connected to one PSTN while the other lines are connected to a different PSTN, etc. The interface unit 201 is responsible for sending and receiving caller IDs. The external lines which are connected to the interface unit 201 also carry caller IDs.

The intranet 207 can be a wired internal phone network, or an internal local area network, or can include both. Please be noted that, a conventional extension phone network can also be equipped with wireless stations, which connect to wireless extension phones with CT2 or DECT protocols. An internal area network can be a wired Ethernet local area network (LAN), or a wireless 802.11x network, or can include both.

With variations of internal network, an internal telephony device can be a wired extension phone, a wireless extension phone, a network phone, or an operating equipment, such as a personal digital assistant, a notebook computer, a desktop computer, etc., which connects to an internal area network and has a network phone software installed.

Taking the wired extension phone network as an example, the unique identifier of each phone device can be the extension number. In the case of the network phone system in a local area network, the unique phone identifier can be a web address, a URL, an IP address or an MAC address, etc. Not being restricted to a particular type of internal network or internal telephony devices, the present invention is applicable to any internal network which can provide caller ID, and can perform calling/receiving communication with the interface apparatus.

In other words, the interface unit connects to at least one PSTN via a plurality of external lines, to provide sending/receiving caller number. The interface also connects a plurality of internal telephony devices, each of which has unique identifier, via an internal network, to provide the calling/receiving functions for an internal telephony device. The interface unit also performs such functions like selecting an external line to setup a call, distinguishing the unique identifier for an internal telephony device, and redirecting the incoming calls to the designated internal telephony device. These features are all built-in functions for equipments such as a general branch switch, a key system, a network branch switch, or a media gateway, etc.

When a PTN user, via an internal telephony device, issues a request for an outgoing call to the interface unit 201, the interface unit 201 receives the internal telephony device identifier (which is equivalent to the PTN caller identifier) and the called party number (PSTN receiver's number). Taking a conventional wired extension network with wired extension phones as an example, when a PTN user picks up the extension phone, the interface unit identifies the off-hook extension by detecting the connectivity status of the internal extension circuitry. After the PTN user finishes the dialing on the phone key pad, the interface unit then also receives the called party number.

If a PTN user uses a network phone, the interface unit receives the network address and the called party phone number from the network parcel for the calling request which is issued from the caller's network phone. These functions are all built in the interface unit, the internal network, and the internal telephony devices.

Figure 3:
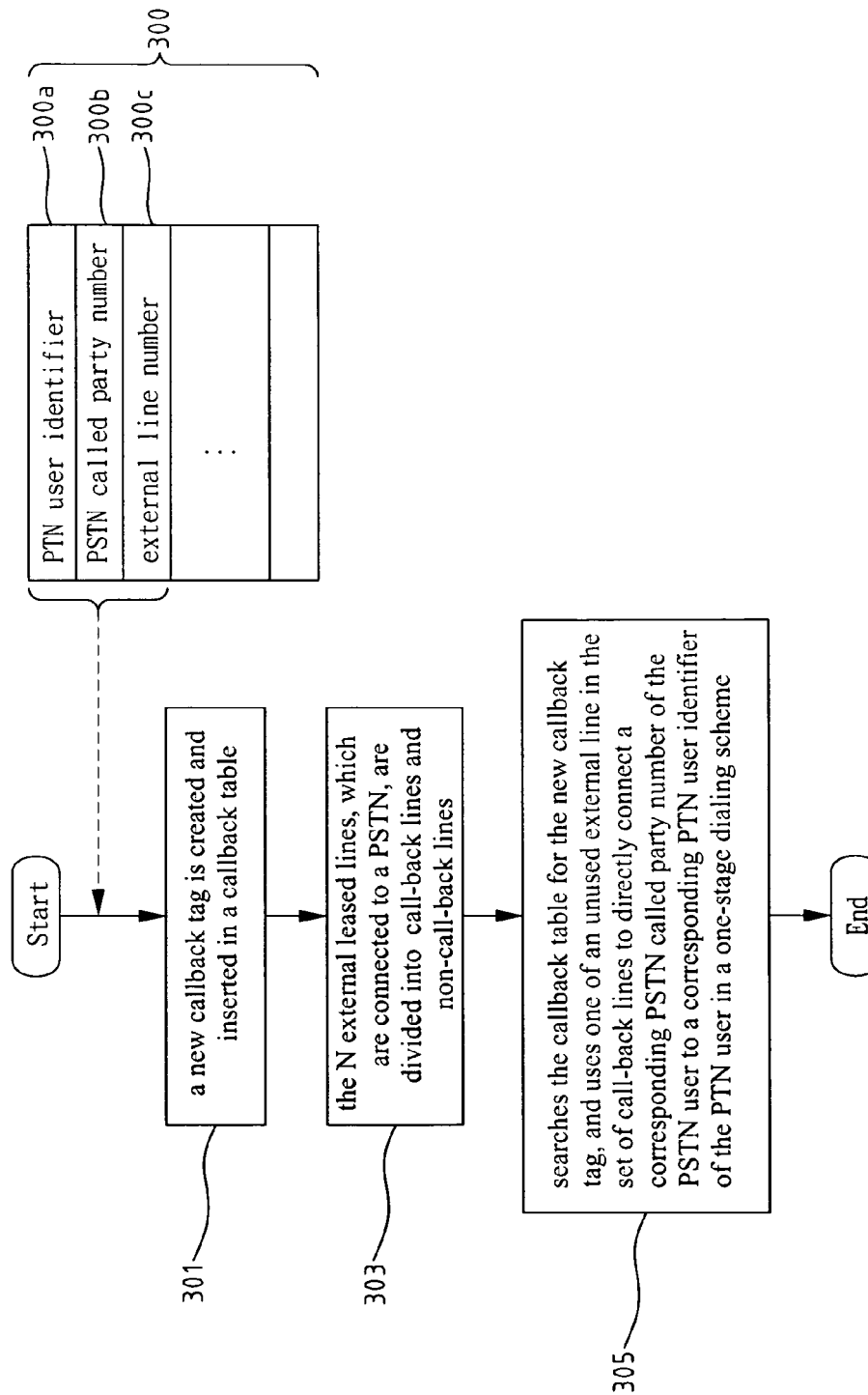
FIG. 3 illustrates the telephone routing method of the present invention.

In the fore going network phone environment, when a PTN user is calling a PSTN user, FIG. 3 illustrates the telephone routing procedure according to the present invention.

First of all, a new callback tag 300 is created and inserted in a callback table, as shown in step 301. This callback table includes a plurality of callback tags. Each callback tag consists of at least three data fields, the PTN user identifier 300a, the PSTN called party number 300b, and the external line number 300c.

Secondly, the N external leased lines, which are connected to a PSTN, are further divided into two sets, one for call-back lines and the other for non-call-back lines, as shown in step 303.

Then the present invention searches the callback table for the new callback tag, and uses one of an unused external line in the set of call-back lines to directly connect a corresponding PSTN called party number of the PSTN user to a corresponding PTN user identifier of the PTN user in a one-stage dialing scheme. This is illustrated in step 305.

Other than the call-back table, in order to more efficiently conduct a search, the present invention can also be implemented with enhanced extra one or more index tables with partial field as key. The call-back table and the associated index tables reside in the storage media (such as memory, magnetic disk drive, webpage, etc.) in the interface apparatus. For example, the call-back table and the associated index tables are stored in a non-erasable magnetic disk drive. In the storing/retrieval process of the present invention, data are first loaded into an erasable memory device. Periodically, the content of the erasable memory device is archived onto a non-erasable magnetic disk memory device.

Figure 4:
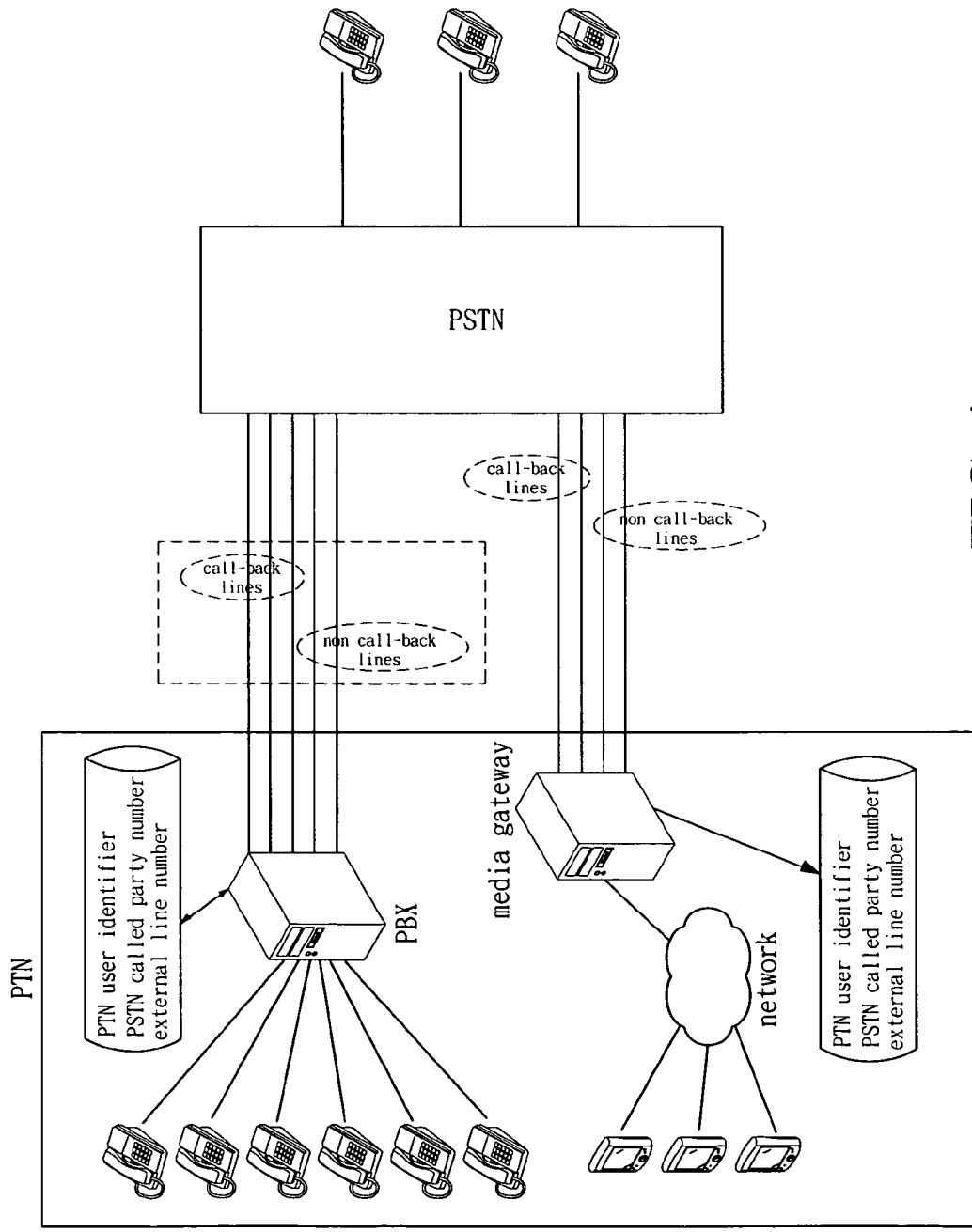
FIG. 4 is a diagram illustrating a network phone environment using the telephone routing method shown in FIG. 3.

FIG. 4 is a diagram illustrating a network phone environment using the routing method shown in FIG. 3. For example, in the PTN environment, the connection unit between the PSTN and PTN uses a PBX or a VoIP media gateway. Referring to FIG. 4, a PTN user can use a conventional phone set to connect to a PBX, or use an internet phone to connect to a VoIP media gateway. Either a PBX or a VoIP media gateway has a plurality of external leased lines to connect to a PSTN. The telephone routing method according to the present invention divides all leased lines into call-back lines and non call-back lines.

The one-stage dialing telephone routing method provided by the present invention only uses the call-back lines. The following details the operation flow for the one-stage dialing method with the present invention. The operation flow includes PTN call origination to PSTN, PSTN call origination to PTN, and callback tags insertion in the callback table.

Figure 5:
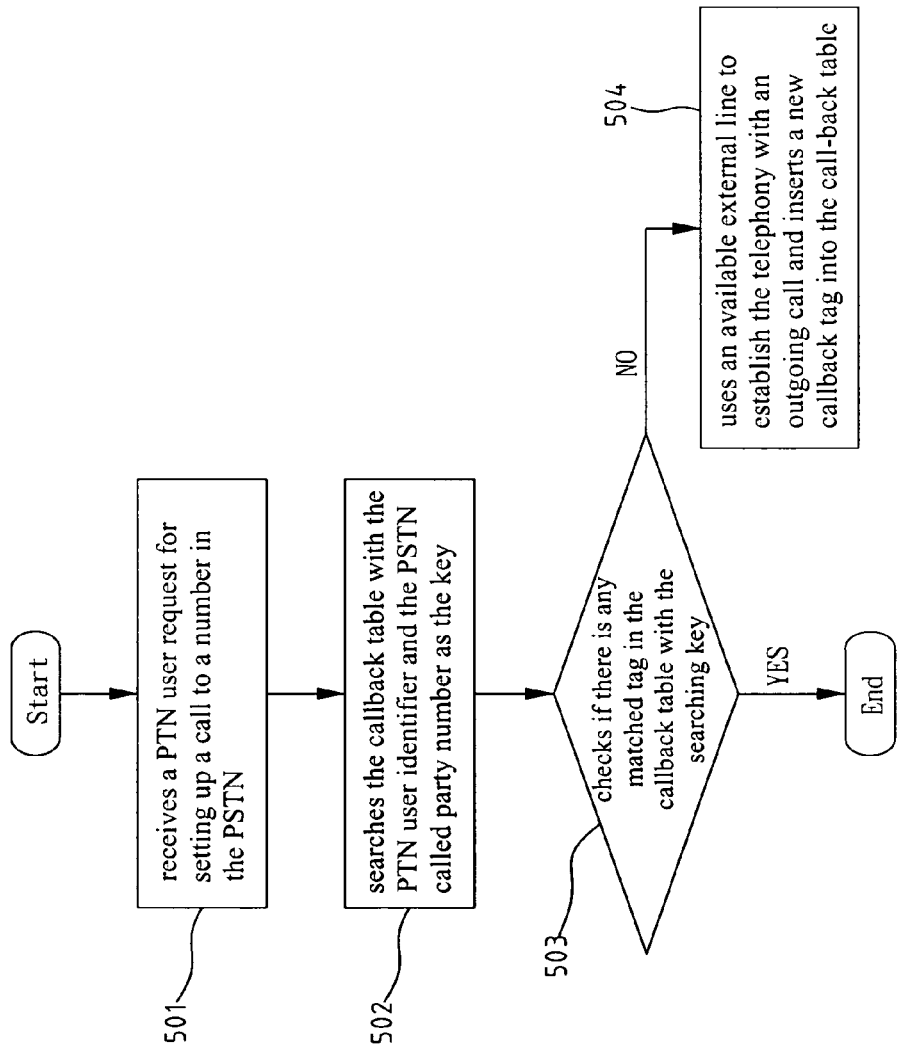
FIG. 5 illustrates the operation flow for the procedure of PTN call origination to PSTN.

FIG. 5 illustrates the operation flow for the procedure of PTN call origination to PSTN. In step 501, the invention receives a PTN user request for setting up a call to a number in the PSTN. In step 502, the invention searches the callback table with the PTN user identifier and the PSTN called party number as the key. In step 503, the invention checks if there is any matched tag in the callback table with the searching key. In step 504, when there is no matched callback tag in the call-back table, the invention uses an available external line to establish the telephony with an outgoing call and inserts a new callback tag into the call-back table. If a matched callback tag is found in the callback table, it means there is already other PTN user that has established the telephony with the same PSTN receiver.

Figure 6:
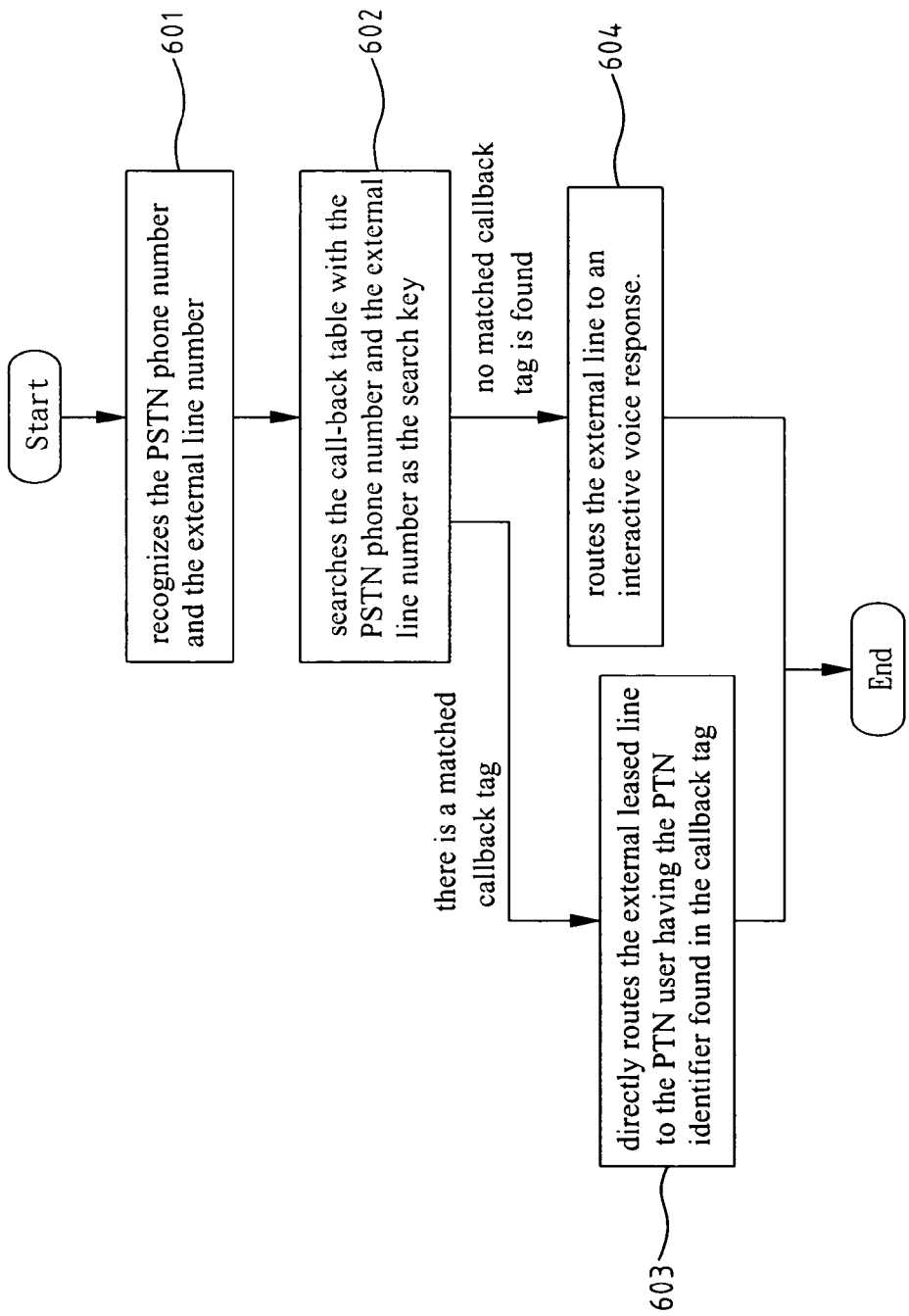
FIG. 6 illustrates the operation flow for the procedure of PSTN call origination to PTN.

FIG. 6 illustrates the operation flow for the procedure of PSTN call origination to PTN. In step 601, while receiving an incoming call from a PSTN user, the present invention first recognizes the PSTN phone number and the external line number. In step 602, the present invention searches the callback table with the PSTN phone number and the external line number as the search key. In step 603, when there is a matched callback tag found in the table, the present invention directly routes the external leased line to the PTN user having the PTN identifier found in the callback tag. In step 604, if no matched callback tag is found in the callback table, the present invention routes the external line to an interactive voice response.

There are varieties of ways to insert a new callback tag in the call-back table. Examples includes a web page interface from a management system (via online network connection and web browser), or a voice interface (via an internal telephony device) to add a new entry to the fall-back table. A new callback tag includes at least three data fields, a PTN user identifier, a PSTN called party number, and the used external line number. The saved callback tag enables a specified PSTN user to call the callback leased line to reach a specified PTN user in a one-stage dialing manner.

Figure 7:
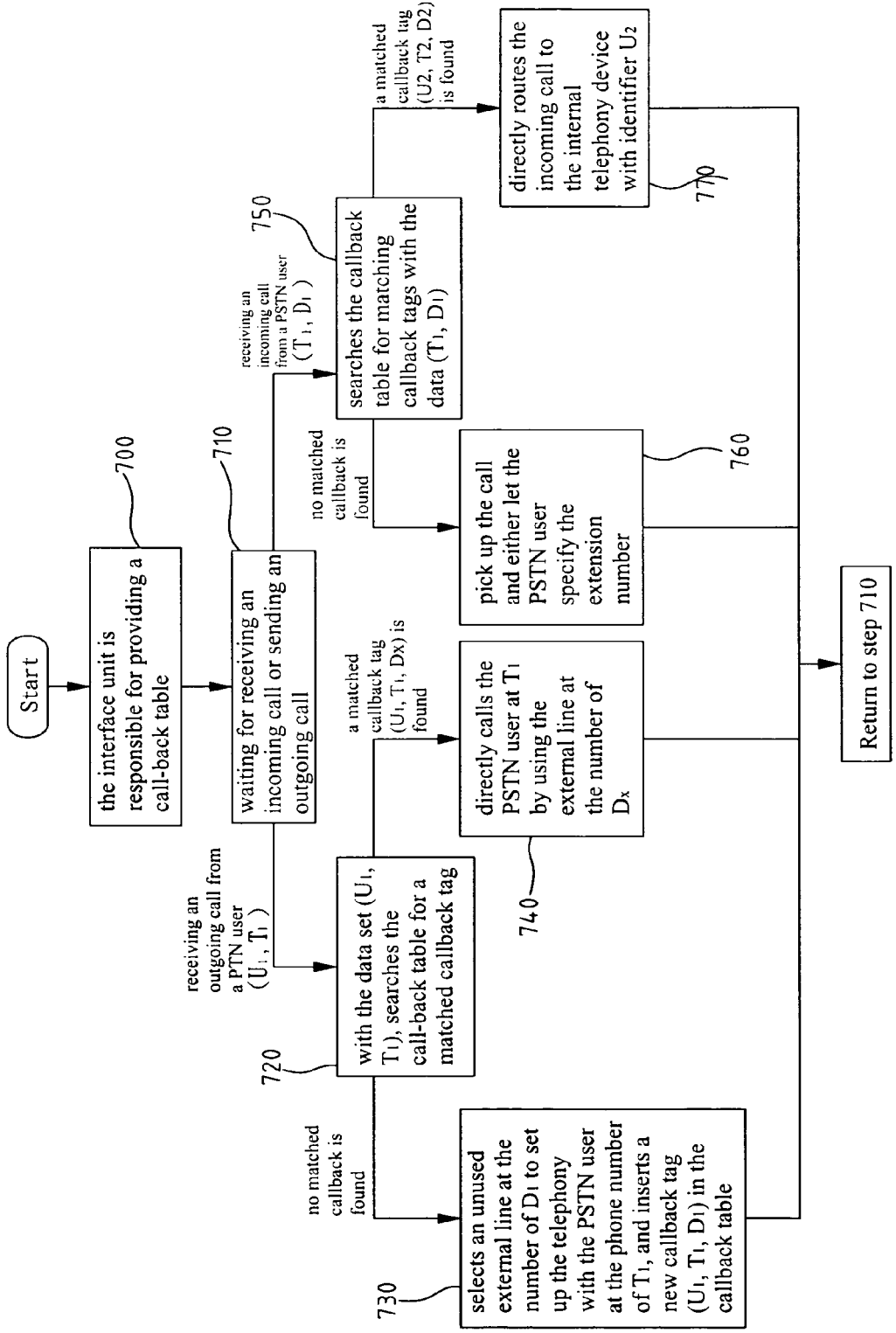
FIG. 7 illustrates the process flow in which the present invention performs for a complete calling/callback cycle with an example of PTN call origination to PSTN, followed by PSTN callback origination to PTN.

According to the fore going technology with the present invention, FIG. 7 is an example simulating that illustrates the process flow in which the present invention performs for a complete calling/callback cycle with an example of PTN call origination to PSTN, followed by PSTN callback origination to PTN. For ease of explanation, the following callback tags are indicated by (U,T,D).

Referring to FIG. 7, the interface unit is responsible for providing a call-back table, as is shown in step 700. The call-back table can be an empty table or can be loaded from a non-erasable memory media. In step 710, the interface unit is waiting for receiving an incoming call from a PSTN user or an outgoing call from a PTN user and entering step 750 or step 720, respectively. After processing the request for either receiving or sending a call, the process flow always comes back to step 710 and waiting for the next request for receiving/sending a call.

The procedure starting with step 720 or step 750 could also be multi-tasked parallel processes. In other words, more than one incoming call receiving and outgoing call sending requests can be processed at the same time. For simplicity, FIG. 7 does not particularly points out how to end a process, such as via a hard direct shut down or through a specified shutdown procedure. The following assumes a case in which a PTN user attempts to make a call to a PSTN user at the number $T_1$ via the phone device $U_1$.

At step 720, with the data set $(U_1, T_1)$, the routing interface unit searches the call-back table for a matched callback tag. If there is no matched callback is found, it means that the phone device $U_1$ has never called a PSTN user at number $T_1$ since the present invention starts execution. The control proceeds to step 730, at which the present invention selects an unused external line out of the N, say at the number of $D_1$, from the interface apparatus to set up the telephony with the PSTN user at the phone number of $T_1$, and inserts a new callback tag $(U_1, T_1, D_1)$ in the callback table.

The strategy for selecting a free external line can be dynamic or following a specified order. When all external lines are in use, the interface unit can either reject the call request or temporarily borrow a free non-call-back line to fulfill the request.

When a matched callback tag $(U_1, T_1, D_x)$ is found for the key $(U_1, T_1)$, it means that the PTN telephony device $U_1$ ever previously requested a call to a PSTN user at the number $T_1$ using the external leased line at the number $D_x$.

Therefore, in step 740, the invention directly calls the PSTN user at $T_1$ by using the external line at the number of $D_x$. If the external leased line $D_x$ is in use at this moment, there are alternative ways to handle this condition. For example, the interface either responds a busy tone back to the calling device $U_1$, or selects another free external line, say at the number of $D_y$, to set up the call to the PSTN user at $T_1$, and inserts a new callback tag $(U_1, T_1, D_y)$ in the callback table to replace the original callback tag $(U_1, T_1, D_x)$. No matter which fore strategy to use, if a callback tag $(U_1, T_1, D_x)$ is found, then the invention uses the external line $D_x$ to set up the telephony with the PSTN user at $T_1$.

No matter which fore strategy to use for selecting the external leased line, the external leased line number, $D_1$, $D_x$, or $D_y$ are all logged in the telephony device (at number $T_1$) for the PSTN user. Sometime later, when the PSTN user uses the external line number and the phone device at T1 to call back the PTN user at $U_1$, the incoming call from PSTN eventually arrives the interface unit, via the PSTN and the external line. The procedure enters step 750.

At step 750, when the interface unit receives an incoming call from a PSTN user at $T_1$ via the external line number at $D_1$ (for example), according to the data $(T_1, D_1)$, the interface unit searches the callback table for matching callback tags with the data $(T_1, D_1)$. Eventually, the callback tag, $(U_1, T_1, D_1)$ is found. In step 770, with the PTN caller identifier $U_1$ in this callback tag, the interface unit directs the external call to the phone device $U_1$ for the PTN user. This accomplishes the one-stage dialing for a PSTN call back to a PTN user.

For any incoming call from a PSTN user assuming at number $T_2$ and via external line number $D_2$, after step 750, there might be the other results from the callback table searching, such as no matched callback tag for $(T_2, D_2)$ or there are more than one callback tags for $(T_2, D_2)$.

If there is no matched callback tag for $(T_2, D_2)$, one way to handle this condition is to pick up the call and either let the PSTN user specify the extension number, as shown in step 760, or let the main line operator to redirect the call (a two-stage dialing).

If there are more than one callback tags matching with $(T_2, D_2)$, there are multiple ways to handle this condition. For example, the interface unit can pick one of the matched callback tags and direct the call to the associated internal telephony device. If this internal telephony device is busy then pick another internal device from the second matched callback tag, etc. In either way, when a matched callback tag $(U_2, T_2, D_2)$ is found, at step 770, the interface unit directly routes the incoming call to the internal telephony device with identifier $U_2$ and accomplishes the one-stage dialing process.

The telephone routing method according to the present invention, divides all N external leased lines connecting to PSTNs into two sets, one for callback lines and the other for non-callback lines. All the non-callback lines are assigned with a single external representative number. In general, an incoming call made by a PSTN user calling this representative number reaches the interface unit via one of the non-callback external lines. For such incoming calls from the non-callback external lines, the interface unit does not search the callback table, but directly picks them up and provides the conventional two-stage dialing. All the callback external lines are reserved for one-stage dialing callback process.

When a PTN user issues an outgoing call to a PSTN user, he/she can choose either a call-back or a non-call-back external line. With such external line usage dividing and selection flexibility, the incoming calls with callback lines and non-callback lines can be separated. The intension of this external line usage division is to reduce the busy rate of the callback lines and give a chance to improve the utilization efficiency of the present invention.

In addition to the external line usage division and the fore going web page interface or other forms of user interface for direct call-back table editing, the telephone routing interface unit of the present invention can provide additional feature like dedicated line setup with some default call-back tags in the call-back table. This feature allows a specified external user (with a specified external phone device) automatically reaches a specified internal telephony device for a specified user by dialing a specified external line number. This extended feature can be accomplished by dividing the external lines into more sets for various purposes, such as a set for the general non-call-back lines $G_1$, a set for call-back lines $G_2$, and a set of lines for dedicated routing calls $G_3$, etc.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for telephone routing between a private telephone network (PTN) and a public switched telephone network (PSTN), said method is applicable to an interface apparatus between said PSTN and said PTN, said interface apparatus connects to a least one PSTN by using a plurality of external lines, and also connects to a plurality of telephony devices via an intranet, when a PTN user make a call to a PSTN user, said telephone routing method comprises the steps of:
   (a) creating and inserting a new call-back tag into a call-back routing table including a plurality of call-back tags;
   (b) dividing all external lines connected to said PSTN into two sets, callback lines and non-callback lines; and
   (c) searching said call-back table for said new inserted call-back tag, and directly connecting a corresponding PSTN called party number of said PSTN user to a corresponding PTN caller identifier of said PTN user via one of said external lines in a one-stage dialing scheme.

2. The method for telephone routing between a PTN and a PSTN as claimed in claim 1, wherein each said call-back tag comprises at least three fields, PTN caller identifier, PSTN called party number, and used external line number.

3. The method for telephone routing between a PTN and a PSTN as claimed in claim 1, wherein said one-stage dialing procedure includes said PTN call origination to said PSTN, said PSTN call origination to said PTN, and inserting call-back tags in said call-back routing table.

4. The method for telephone routing between a PTN and a PSTN as claimed in claim 1, wherein, in said PTN environment, a connection unit between said PSTN and said PTN is a network branch switch.

5. The method for telephone routing between a PTN and a PSTN as claimed in claim 1, wherein, in said PTN environment, a connection unit between said PSTN and said PTN is a media gateway.

6. The method for telephone routing between a PTN and a PSTN as claimed in claim 3, wherein said PTN call origination to PSTN comprising the steps of:

(c11) receiving a call setup request from said PTN user indicating the called party number in said PSTN;

(c12) using said PTN caller identifier and said PSTN called party number as the key to search said call-back routing table;

(c13) checking if there is a matched call-back tag; and (c14) if no matched call-back tag is found, then creating a new call-back tag, establishing the connection with an unused external line and inserting said new call-back tag into said call-back table.

7. The method for telephone routing between a PTN and a PSTN as claimed in claim 3, wherein said PSTN call origination to said PTN comprising the steps of:

(c21) recognizing the identifier of the called party number of said PSTN and used external line number for said PSTN call origination to said PTN;

(c22) using said identifier of the called party number of said PSTN and used external line number as the key to search said call-back routing table;

(c23) if a matched call-back tag is found, then directly routing said PSTN call to said PTN user indicated by said PTN identifier in said found call-back tag; and (c24) if no matched call-back tag is found, then routing said PSTN call to an interactive voice response.

8. The method for telephone routing between a PTN and a PSTN as claimed in claim 3, wherein said inserting call-back tags in said call-back table is done by adding a new entry to said call-back table through a web page interface.

9. The method for telephone routing between a PTN and a PSTN as claimed in claim 3, wherein said inserting callback tags in said callback table is done by adding a new entry to said callback table through a voice interface.

10. The method for telephone routing between a PTN and a PSTN as claimed in claim 1, wherein said PSTN is either a cable PSTN or a wireless mobile phone network.

11. The method for telephone routing between a PTN and a PSTN as claimed in claim 1, wherein said interface apparatus includes a branch switch, a key system, a network branch switch, and a media gateway.

12. The method for telephone routing between a PTN and a PSTN as claimed in claim 1, wherein said call-back table is a storage media that resides on said interface apparatus.

13. The method for telephone routing between a PTN and a PSTN as claimed in claim 1, wherein said callback routing table is initialized as an empty table when said interface apparatus resets.

14. The method for telephone routing between a PTN and a PSTN as claimed in claim 1, wherein said callback routing table is initialized with a preset call-back table loaded from a memory device when said interface apparatus resets.

15. An apparatus for telephone routing between a public switched telephone network (PSTN) and a private telephone network (PTN), comprising:

an interface unit that connects to at least one PSTN via a plurality of external lines, and connects to a plurality of internal telephony devices via an intranet, and provides the calling/receiving functions between an internal telephony device and a PSTN user; and a storage media that stores a callback table including a plurality of callback tags;

wherein said telephone routing apparatus utilizes said callback tags to enable a PSTN user reaches its corresponding PTN user in a one-stage dialing scheme.

16. The apparatus for telephone routing as claimed in claim 15, wherein said interface unit includes an interface facility that includes a branch switch, a key system, a network branch switch, and a media gateway.

17. The apparatus for telephone routing as claimed in claim 15, wherein said plurality of external lines are divided into at least two sets, one for call-back lines, and one for non-call-back lines.

18. The apparatus for telephone routing as claimed in claim 15, wherein said storage media includes a memory facility, a web page interface, and a voice interface.

19. The apparatus for telephone routing as claimed in claim 15, wherein said internal telephony device is a network telephone.

20. The apparatus for telephone routing as claimed in claim 15, wherein each said call-back tag consists of at least three fields that are the PTN caller's identity, the PSTN called party number, and the external line number used for the call.

* * * * *